United States Patent Office.

LEWIS S. CHICHESTER, OF BROOKLYN, NEW YORK, ASSIGNOR TO CHARLES F. CHICHESTER, OF SAME PLACE.

IMPROVEMENT IN FOOD COMPOUNDS.

Specification forming part of Letters Patent No. 136,304, dated February 25, 1873.

*To all whom it may concern:*

Be it known that I, LEWIS S. CHICHESTER, of Brooklyn, in the county of Kings and State of New York, have invented an Improved Food Compound, of which the following is a specification:

The object of this invention is to obtain from cereals a food containing as nearly as possible the same ingredients as those contained in healthy human milk.

In the climate of the United States, especially in the middle portion of the country, a large proportion of mothers are not able to or do not nurse their own children, and consequently a large per cent. of infants die through improper food or neglect of the wet-nurse.

This invention consists in a compound prepared in a peculiar manner from oats and wheat so as to contain very similar ingredients to human milk, and this material is desiccated and inclosed in air-tight packages, in order to keep the same pure and sweet.

The oats and wheat are scoured and cleaned separately and desiccated. The oats are reduced to a fine meal. The wheat is reduced to a meal, preferably by revolving pulverizers, which break up the particles of starch more finely than the other parts of the berry, so that the excess of starch can be removed by sifting. The remaining portion of the wheat and the oatmeal, in about the proportion of twelve parts of wheat and eighty-eight parts of oatmeal, are moistened with pure water and mixed into a soft dough, and spread out thinly upon plates or trays, and baked thoroughly without burning. The baked cakes or wafers are ground into a fine flour, and to this alkali and sugar may be added, and the material mixed together and put up in packages of convenient size, care being taken to exclude the flour from atmospheric influences.

This material is to be prepared for use by mixing one part thereof with about eight or nine parts of water, and boiling thoroughly.

The material prepared in this manner contains nothing that is liable to injure an infant, and, upon analysis, is found to contain nitrates, phosphates, carbonates, and water in about the same proportion as they occur in human milk.

In some cases it may be desirable to make this compound from wheat alone, in which case the wheat is prepared as aforesaid, so that the starch can be removed from the same; but only that amount of starch is removed as will leave the residuum of nitrates, carbonates, and phosphates in about the same proportion as found in human milk, which proportion is about 27.29 nitrates, 64.50 carbonates, 4.21 phosphates, and 4 water, when thoroughly desiccated.

I claim as my invention—

The food compound prepared of the materials and in substantially the manner specified.

Signed by me this 12th day of August, A. D. 1872.

LEWIS S. CHICHESTER.

Witnesses:
GEO. T. PINCKNEY,
CHAS. H. SMITH.